INVENTOR.
Joseph M. Walsh

INVENTOR.
Joseph M. Walsh

United States Patent Office 3,778,344
Patented Dec. 11, 1973

3,778,344
NUCLEAR ENGINE FLOW REACTIVITY
SHIM CONTROL
Joseph M. Walsh, Pittsburgh, Pa., assignors to the United
States of America as represented by the United States
Atomic Energy Commission
Filed Mar. 21, 1968, Ser. No. 715,132
Int. Cl. G21c 7/28
U.S. Cl. 176—22                                           15 Claims

ABSTRACT OF THE DISCLOSURE

A nuclear engine control system is provided which automatically compensates for reactor reactivity uncertainties at the start of life and reactivity losses due to core corrosion during the reactor life in gas-cooled reactors. The coolant gas flow is varied automatically by means of specially provided control apparatus so that the reactor control drums maintain a predetermined steady state position throughout the reactor life. This permits the reactor to be designed for a constant drum position and results in a desirable, relatively flat temperature profile across the core.

BACKGROUND OF THE INVENTION

This invention was made in the course of, or under, a contract with the U.S. Atomic Energy Commission.

This invention relates to nuclear reactor reactivity control systems and more specifically to a reactivity control system for gas-cooled rocket engine reactors which has a flow reactivity shim control to allow control drums to maintain a steady state position and thus improve reactor power operation and extends the useful life of the reactor.

In a nuclear reactor open-cycle rocket engine, the reactor is used to heat a propellant gas. The gas is then ejected by expanding it through a rear nozzle, thereby developing propulsion thrust. Basically, the functional components of a nuclear rocket consist of: a storage tank for a suitable coolant propellant such as liquid hydrogen; a tupbopump to feed the coolant into the engine proper; a gas-cooled reactor; a fluid-cooled jet nozzle; and controls. The specific impulse developed (and thus the engine efficiency) is a function of the temperature of the exhausting gas jet; hence it is desired to operate the reactor at as high a temperature as is practicable. A limiting factor is the mechanical strength of the reactor materials. Mission requirements demand that the engine must be compact and of minimum weight; hence, the reactor must operate at maximum power densities. Further, the engine must be capable of starting and stopping quickly and precisely. For a more detailed discussion of components of nuclear rocket engines of the prior art, reference is made to "Nuclear Propulsion for Space," one of a series of publications on Understanding the Atom, by the U.S. Atomic Energy Commission, Division of Technical Information.

In the past, control drums positioned around the periphery of the reactor core were the only reactivity control element available to control rocket engine nuclear reactions for the rated operating conditions of the reactor. The reactor was designed for a predicted drum operating position that would result in a flat temperature profile across the reactor core. The control drums referred to herein are conventional drums constructed of a neutron reflector material with a portion of their surface covered with a poison material which absorbs neutrons. At start-up of the reactor and poison sides of the drums are slowly rotated out way from the reactor core allowing neutrons to be reflected back into the core region which were previously absorbed by the poison material. The drums are rotated out until the reactor goes critical. This position, defined as the reactor hot critical drum position in power operation, should be very close to the predicted drum operating position. Positions greater than or lesser than this predicted position either increase or decrease the neutron reflections, thus increasing or decreasing, respectively, the core reactivity. Due to uncertainties in the reactor hot critical drum position and especially due to the large corrosion reactivity loss during the reactor life, operating at rated power, the drums actually operated at positions up to 60% greater than the designed drum operating position in order to compensate for core corrosion and other reactivity uncertainties during the life of the reactor. This caused large power and temperature peaks in the region of the core periphery and resulted in severe damage to the reactor core due to excessive core material temperatures in this region.

SUMMARY OF THE INVENTION

In view of the problems in the prior art gas-cooled reactor control, it is a primary object of this invention to provide a control system in which a flow reactivity shim control improves the reactor power operation and aids in extending the operating life of the reactor.

Another object of the present invention is to provide a rocket engine reactor ocntrol system in which the nozzle chamber pressure and temperature controls are made independent.

Further, it is an object of the present invention to provide an automatic flow reactivity shim control which allows the control drums to be positioned at a predetermined steady state position.

In accordance with the present invention, a gas-cooled nuclear rocket engine reactor control system is provided which takes advantage of a counterflow support tube system to provide shim control during operation of the reactor. The tubes which support the reactor core from an upper support plate have been adapted to allow a portion of the coolant to pass down through the tubes and counterflow back up to the top of the reactor core through counterflow passages surrounding the tubes. The gas then recombines with the primary reactor core cooling gas flow which passes through cooling channels in the reactor core. By controlling the gas flow through the support tubes, it has been found that the reactivity of the core can be changed in proportion to the change in the support tubes coolant flow.

A pressure servo control loop is provided to control the desired thrust chamber pressure. The measured chamber pressure is compared with a pressure demand to automatically position a turbine pressure control valve located in a turbine drive line fed from the pressure chamber.

A second servo control loop is provided to control the desired nozzle chamber temperature. The measured chamber temperature is compared with a demand temperature to provide an output signal to position the control drums. When the drums are positioned at a desired steady state position, a change in chamber temperature will tend to reposition the control drums thereby altering the core reactivity and maintaining the desired chamber temperature. The second servo control loop is further provided with a coolant flow controller which compares the measured drum position with a steady state demand position. The output of the coolant flow controller repositions a tie tube flow control valve so that the tie tube flow rate is altered. Thus, the corresponding tie tube flow reactivity contribution is altered proportionally to allow the control drums to return to the desired steady state position.

Other objects and many of the attendant advantages of the present invention will become evident from the following description when taken in conjunction with the accompanying drawings, wherein the like reference numerals indicate similar items throughout the figures.

DETAILED DESCRIPTION

Figure 1:
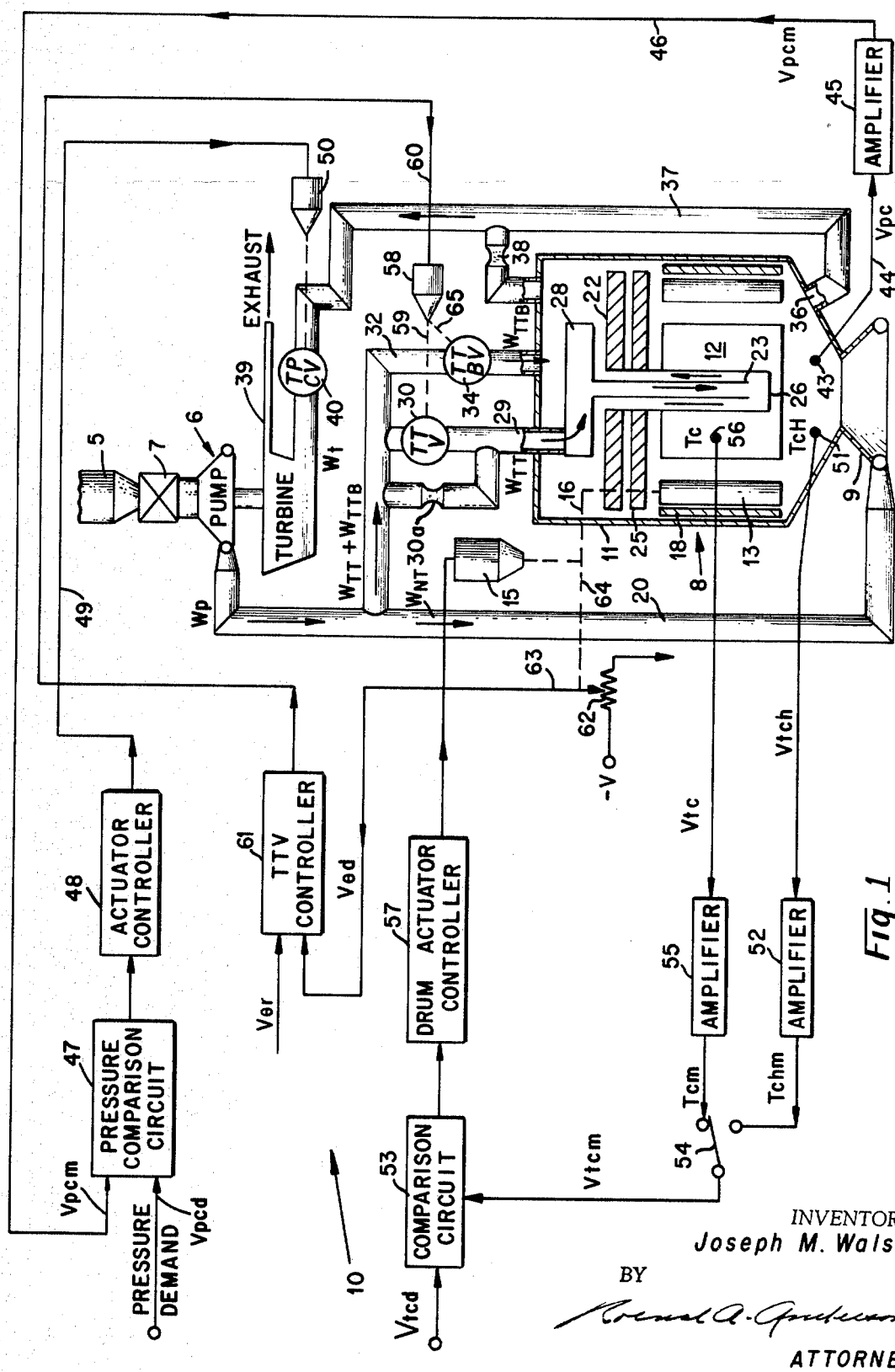
FIG. 1 is a schematic diagram of a nuclear reactor flow reactivity shim controller according to the present invention.
Figure 2:
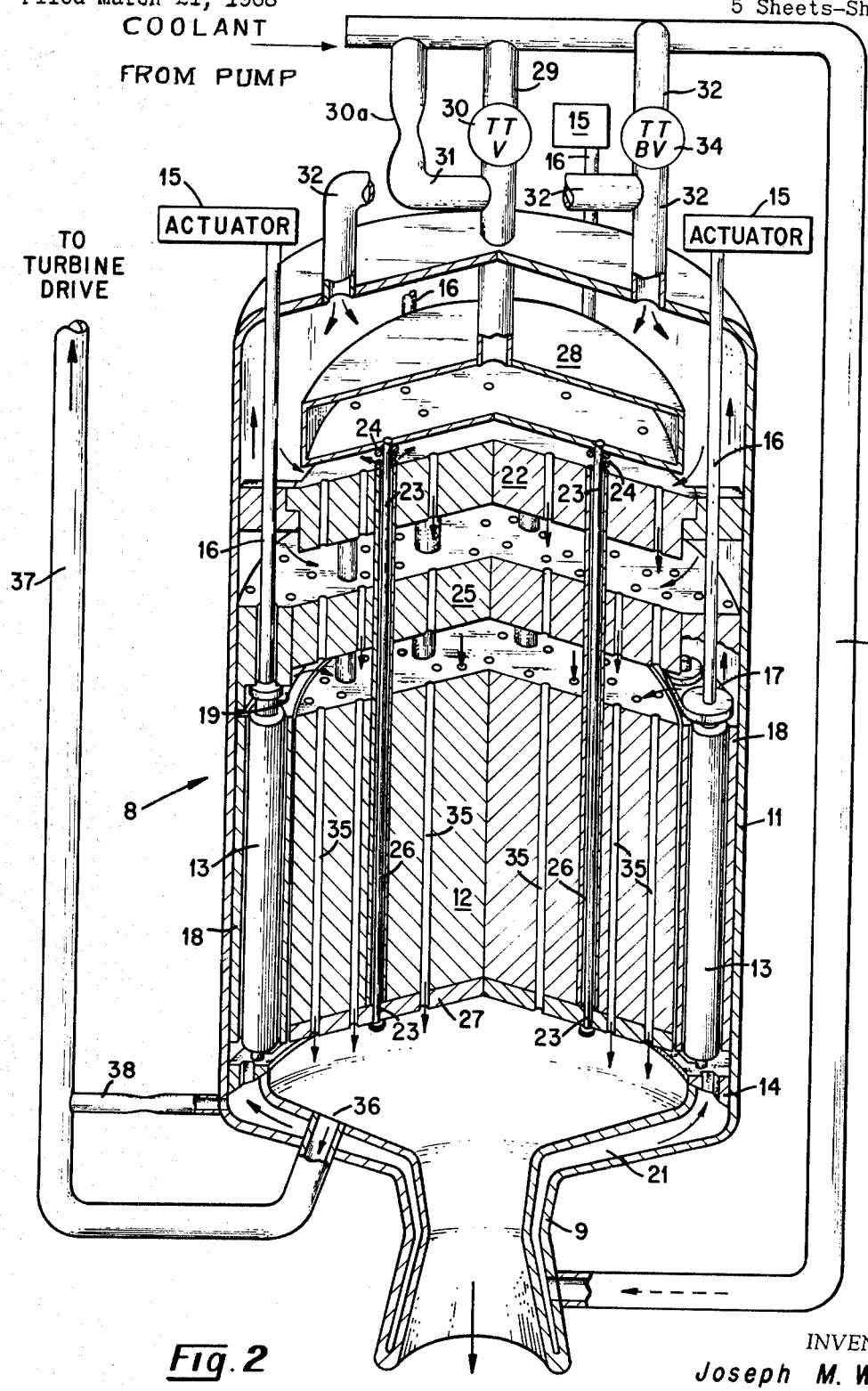
FIG. 2 is a sectional view of the reactor core area of a nuclear rocket engine which is to be controlled.

Referring now to FIGS. 1 and 2, there is shown a gas-cooled reactor system which is designed especially to satisfy the requirements of a space propulsion system. As pointed out above, the basic components of a nuclear rocket include a coolant-propellant storage tank 5, a turbopump 6 including an inlet valve 7 between the storage tank and the pump; a gas-cooled reactor 8 shown in detail in FIG. 2; a fluid-cooled jet nozzle 9; and controls generally indicated at 10 (FIG. 1). Shim control of a nuclear engine reactor by varying the mass of coolant present within the core once the reactor has gone critical is the general object of this application. The structural provisions outside of the present control system form no part of this invention, and, therefore, will be described only to the extent necessary to provide a clear understanding of the present invention. In this regard, a brief discussion of the nuclear engine with which the present control system is quite useful is in order.

As shown in FIG. 2, a pressure chamber 11, including a rearward opening forming jet nozzle 9, contains the cylindrical gas-cooled reactor core 12 which will be discussed in more detail. The core 12 is surrounded at its outer periphery by control drums 13 which extend the length of the core and are rotatably supported by a lower support ring 14. The drums 13 are of conventional design with the greater portion thereof being a reflector material, such as beryllium and covered on one side with a neutron "poison" such as boron. When all the drums absorbing ("poison") faces are turned inward, neutrons that would otherwise be reflected back into the core to cause new fissions are absorbed by the poison instead. To start the reactor, drum actuators 15 slowly rotate the control drums, moving the poisons away from the core regions, thus giving the neutron economy a boost. The actuators 15, of which only three are shown in FIG. 2, are coupled to the drums 13 by means of drive rods 16. The drive rods 16 penetrate the pressure chamber 11 at the top and are coupled to the selected drums, while the other drums are driven through a mechanical coupling system which is entirely contained inside the pressure vessel. The drums are linked together for rotation by means of a titanium strap and pulley arrangement 17. By using only six actuators and drive rods, weight is conserved while the necessary control is still obtained, and the number of penetrations is reduced as well.

At start-up the drums are rotated until they reach a predetermined steady state position while a minimum flow of coolant is maintained through reactor tie tubes 23. Additional shim control of the reactor from this point will be explained later.

The reactor core is completely encircled by a beryllium neutron reflector 18 of a predetermined thickness. The reflector 18 is adapted to receive the control drums 13 and is provided with cooling channels 19. The larger portion of the pump coolant is fed by means of a nozzle coolant conduit 20 into a nozzle coolant channel 21. The nozzle coolant passes up through support ring 14, reflector cooling channels 19, and the spacing around drums 13. At the top of the reflector the nozzle coolant flow recombines with the remainder of the reactor coolant flow entering at the top of pressure vessel 11.

According to the present invention, the reactor core 12 is supported from an upper support plate 22 by means of the tie tubes 23 of which only two are shown in section in FIG. 2 and one is shown schematically in FIG. 1. The number of tie tubes will depend upon the size of the reactor core and are spaced throughout the core in an orderly array. To accommodate the change in core dimension arising from thermal expansion during operation, the tie tubes 23 are supported by means of springs 24 which bear against support plate 22. Side restraint components (not shown) are provided to further accommodate thermal expansion of the core and to eliminate core vibration.

Figure 3:
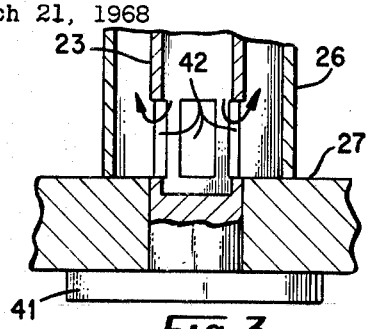
FIG. 3 is a detailed view of the lower end of one core support tie tube showing its modification for coolant counterflow according to the present invention.

The tie tubes 23 extend downward through openings in a shield plate 25 and through counterflow coolant passages 26 in core 12. The tie tubes are rigidly connected at their lower extremity to a core support plate 27, as shown in detail in FIG. 3. The tie tubes are plugged at their lower ends and connected to the plate 27 in a conventional manner, as by welding an end cap 41 to plate 27. Each of the tubes is provided with openings 42 which allow coolant flowing down through the tubes to counterflow through the corresponding counterflow passages 26 back to the top of the reactor core.

Tie tubes 23 are connected at their upper end to a tie tube supply plenum 28 from which a portion of the pump bleed coolant is fed into the tie tubes. Coolant is fed through a tie tube supply conduit 29 containing a tie tube supply valve (TTV) 30. A supply line 31 containing a restricting orifice 30a is connected to bypass valve 30 in order to ensure a minimum coolant flow to maintain structural integrity of the tubes during start-up and shutdown of the reactor. The remainder of the pump bleed coolant flow, which bypasses the tie tubes enters the pressure chamber 11 through lines 32 which contain a tie tube bypass valve 34. The combined reactor coolant passes down through the support plate 22, shield 25 and through cooling channels 35 in the reactor core 12. The cooling channels 35 are disposed in an orderly array and designed in such a manner that all the fission-generated heat is transferred to the coolant gas driven through the core by pump 6. The channels 35 are coated with a corrosion-preventive coating, such as niobium carbide, to prevent the high velocity hot coolant gas from corroding the graphite core. The gas leaving the hot or exit end of the reactor core 12 is expanded through the nozzle 9 to provide thrust.

A small portion of the heated gas stream is bled off at a predetermined point 36 by means of a hot bleed line 37, diluted with a little cold coolant through orifice 38 connected between the nozzle coolant channel 9 and line 37, directed through the turbine of the turbopump 6, and exhausted through exhaust line 39 (FIG. 1).

As shown in FIG. 1, the turbine bleed line is connected through a turbine pressure control valve (TPCV) 40. Valve 40 is controlled by means of a pressure servo control loop which senses the nozzle thrust chamber pressure at 43 by means of a pressure transducer which has an output voltage ($V_{pc}$) proportional to the chamber pressure. This voltage is fed, by means of lead 44, to a signal amplifier 45 whose output is transmitted by means of lead 46 to the input of a pressure comparison circuit 47. The comparison circuit 47 is of standard design, such as a differential amplifier, and compares the measured pressure signal ($V_{pcm}$) which has been properly conditioned by amplifier 45, with a demand signal $V_{pcd}$ applied at another input of comparison circuit 47. The difference between the measured pressure signal and the demand signal is provided at the output of comparison circuit 47. This difference or error signal is applied to a valve actuator controller 48 which provides the necessary power output at least 49 to drive a turbine pressure control valve actuator 50. Actuator 50, in turn, opens or closes valve 40 responsive to the error signal polarity. Thus, the nozzle chamber pressure is controlled in accordance with the pressure demand for a given thrust demand. The speed of the turbine is increased or decreased to raise or lower the nozzle chamber pressure, respectively, by increasing or decreasing the opening of valve 40.

Independent nozzle chamber temperature control is provided by a servo loop which senses the nozzle chamber temperature and compares this temperature with the demand temperature level to provide an error signal to rotate the ganged control drums 13 in or out, thus increasing or decreasing as necessary the core 12 reactivity in order to control the desired nozzle chamber temperature.

The nozzle chamber temperature is sensed by means of a thermocouple (not shown) at 51. The thermocouple output voltage $V_{TCH}$ which is proportional to the temperature of the hot core gases passing out of the core 12, is transmited to an amplifier 52 which amplifies and conditions $V_{TCH}$ for application to a temperature comparison circuit 53 similar to the pressure comparison circuit 47 discussed above. A switch 54 is provided for selectively connecting the output of amplifier 52 or the output of a second amplifier 55 which amplifies a voltage signal $V_{TC}$ transmitted thereto from a core implanted thermocouple (not shown) at 56. Signal $V_{TC}$ in the temperature control loop is used during start-up of the reactor to control the core temperature, thus preventing the core temperature from exceeding a value which could damage the core structure prior to the heated gas flow from the core.

The temperature comparison circuit 53 compares the core temperature signal ($V_{TC}$) or the nozzle chamber temperature signal ($V_{TCH}$) depending upon the position of switch 54, with a predetermining temperature set demand signal ($V_{TCD}$) input to provide an error signal which is coupled to a drum actuator controller 57. Drum actuator controller 57 provides the necessary power output to drive actuators 15 of which only one is shown in FIG. 1.

At this point sufficient control is provided to bring the reactor critical and to provide shut-down with a minimum tie tube 23 coolant flow as provided by means of orifice 30a. Thus, according to the present invention, at start-up the drums are fixed at a critical position for gross reactor power level control with minimum tie tube flow. The tie tubes take over temperature control following start-up of the reactor by increasing the flow to the tie tubes to maintain criticality and allow the drums to maintain a desired pre-set steady state position. Tie tube flow control is used for hot shimming or core control of the reactor and to compensate for losses in reactivity due to core corrosion. In prior art nuclear rocket engines, the loss in reactivity due to core corrosion was compensated for by further rotation of the control drums to increase the reflectance of neutrons back to the core and thus increase reactivity to compensate for the corrosion loss. This caused temperature peaks in the core periphery resulting in severe damage to the reactor core, as pointed out above.

As shown in FIG. 1, this automatic flow reactivity shim controller consists of the tube flow valve 30 mechanically coupled to a valve actuator 58 by means of linkage 59. Actuator 58 is connected by means of lead 60 to a specially provided tie tube valve controller 61 whch compares the drum position with a desired set demand position and produces a command to the tie tube valve actuator at its output. The preferred embodiments of the controller will be explained in detail below.

The measured drum position is the only external input required in the operation of this flow reactivity shim controller. This measurement is made at the drum actuator shafts. A drum actuator position transducer is provided for each of the drum actuators 15, of which only one is shown for simplicity. The transducers consist of a potentiometer 62 across which is impressed a negative reference voltage ($-v$.). The adjustable contact 63 of the potentiometer is positioned by actuator 15 through mechanical linkage 64. The potentiometer 62 is calibrated so that its output at the adjustable contact 63 provides a drum actuator position signal $V_{ed}$ proportional to the drum actuator position. Signal $V_{ed}$ is applied to controller 61 along with a reference demand signal $V_{er}$ which, in turn, controls the tie tube valve actuator 58.

It should be noted that actuator 58 also positions the tie tube bypass valve (TTBV) 34 by means of linkage 65 which is connected in a maner to provide a constant bleed flow rate ($W_{TT}+W_{TTB}$) from pump 6 while altering the core reactivity by increasing or decreasing the tie tube flow. Actuator 58 drives the TTV30 and TTBV34 so that when the flow through valve 30 is increased or decreased the flow through valve 34 is decreased or increased, respectively, to maintain constant pump bleed flow. This permits the nozzle tubes (not shown) which are fed by coolant flow $W_{NT}$ through line 20 to be designed for a constant maximum pressure and flow rate.

In operation, when the measured drum actuator position signal $V_{ed}$ becomes larger than the reference $V_{er}$, due to a temperature decrease forcing the drums to rotate out to increase reactivity, the TTV controller 61 commands the TTV activator 58 to increase the tie tube valve 30 opening position. This increases the amount of coolant flow through line 29 into the tie tube supply plenum 28 feeding the tie tubes 23. This increases the tie tubes flow rate, $W_{TT}$, and the corresponding tie tube flow reactivity contribution, $\delta K_{pt}$, which is proportional to the coolant, in this case hydrogen, mass stored in the reactor tie tubes. The relationship of $\delta K_{pt}$ and $W_{TT}$ can be approximately stated as follows:

$$\delta K_{pt} \approx a + b(W_{TT} - C)$$

for $W_{TT} \geq C$ where $C=$ Minimium allowable tie tube coolant flow rate.
$a=$ Minimum tie tube reactivity corresponding to tie tube flow rate $W_{TT}=C$.
$b=$ Constant.

The increase in tie tube reactivity contribution, $\delta K_{pt}$, results in an increase in the nuclear reactor excess reactivity, $\delta K$. The increase in $\delta K$ results in an increase in reactor thermal power and corresponding increased reactor core and nozzle chamber temperatures for a given chamber pressure.

A negative temperature error is produced at this point since the measured temperature signal $V_{TCHM}$ becomes larger than the temperature demand signal. This reverses the polarity of the error signal at the output of comparison circuit 53 which, in turn, reverses the drum actuator controller 57, causing the drum actuators 15 to slowly rotate the control drums back to their desired predetermined steady state position.

The above-described effects for a greater drum position wherein the poison portion of the drums is rotated farther away from the central core region are reversed for a lesser drum position wherein the poison portion of the drnm is rotated farther toward the central core region. The net result in the latter case is that the tie tube valve 30 is closed further, resulting in the drums rotating back from their lesser drum position.

Operation of the tie tube valve actuator 58 thus results in altering the position of tie tube valve 30, as required, such that a controlled variation of the coolant flow in the tie tubes and corresponding flow reactivity produced compensates for large temperature variations during operation to allow the drums to maintain their steady state position. Assuming that the coolant stored in the liquid coolant tank 5 is hydrogen, it is well known that the reactivity of the core is directly proportional to the inner core hydrogen mass. Keeping in mind that it is necessary to maintain a constant gas velocity through the nozzle 9 an increase in flow through the tie tubes 23 and passages 26 increasing the hydrogen residence mass (the hydrogen mass within the core at a given time) must be counterbalanced by an equal decrease in the tie tubes bypass coolant flow through the tie tubes bypass valve 34. As pointed out above, this is accomplished by actuator 58 which drives valves 30 and 34 in opposite directions simultaneously. The variations of hydrogen mass residence are proportional to the volume and flow rate of tie tubes and counterflow channels 26. Since the cooler hydrogen which flows into the tie tubes has a greater density than that flowing through the cooling channels 35 (FIG. 2), this mass can further be increased by increasing the first pass volume (the tie tubes inner diameter) relative to the second pass volume (counterflow passages), so that a maximum volume is available to the highest density hydrogen.

The net result is an automatic flow reactivity shim control that compensates for reactor reactivity uncertainties at the start-of-life and reactivity losses due to core corrosion during the reactor life. This flow shim control automatically resets the drums slowly to their predetermined operating position during the operating life of the reactor, thus maintaining a more desirable uniform radial temperature during the core life and minimizing power and temperature peaks at the core periphery. This is very important since it is desired to operate a nuclear engine core at maximum rated temperature.

Figure 4:
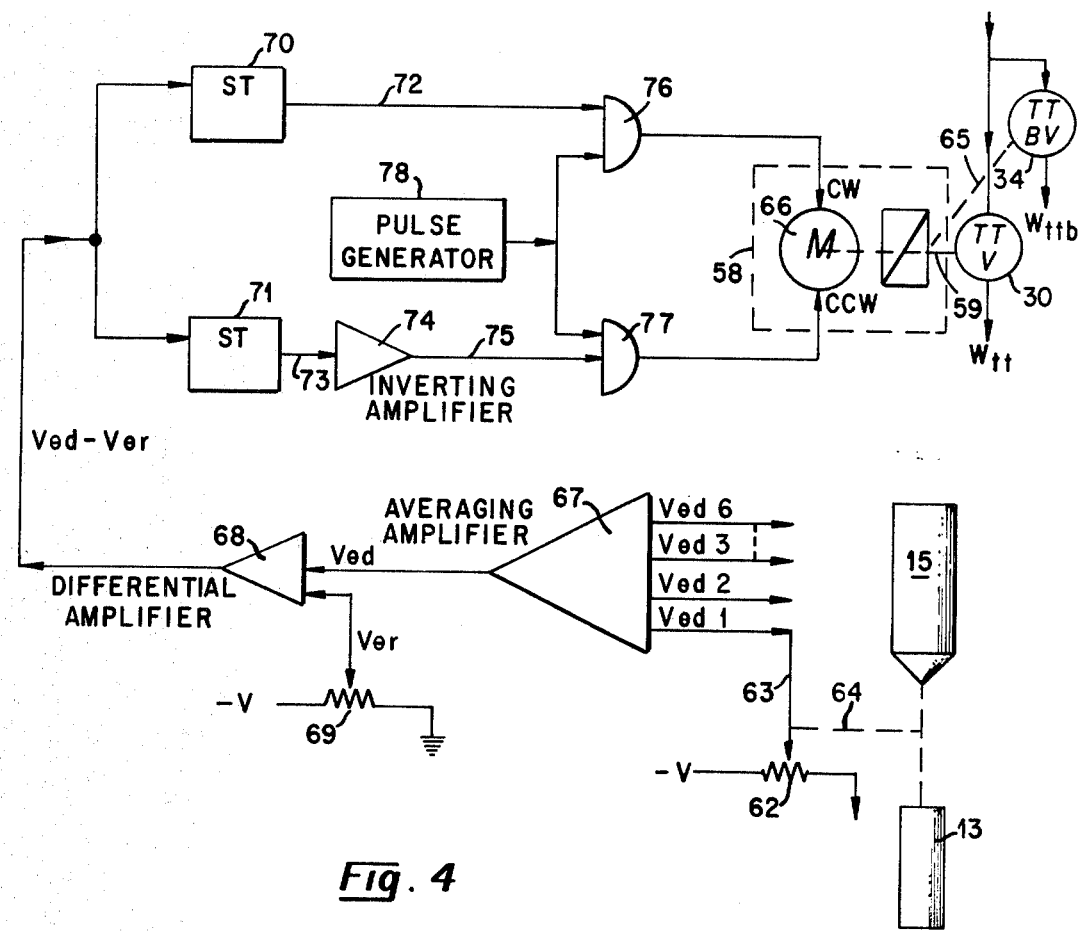
FIG. 4 is a schematic diagram of a servo control loop for flow reactivity shim control using a stepping motor to actuate the coolant flow valves.

Referring now to FIG. 4, one embodiment of the tie tube valve controller 61 is shown. In this embodiment an electrical pulsed stepping motor and gear train 66 are used as the valve actuator 58, shown within the dotted outline. This arrangment provides flexibility for operating redundant valves (not shown) for increased reliability due to position synchronization of stepping motors. Redundant motors are connected in parallel with motor 66. As pointed out above, the adjustable contacts 63 of potentiometers 62 (FIG. 1) are positioned by the rotation of actuator 15 output shafts to provide a signal $V_{ed}$ proportional to the drum actuator position. In the preferred embodiment, six actuators are provided. To ensure reliable drum actuator position measurement, the output from each transducer ($V_{ed_1}$ through $V_{ed_6}$) are connected to separate inputs of an averaging amplifier 67 which provides an output signal $V_{ed}$ proportional to the average drum actuators positions. This signal is fed to one input of a differential amplifier 68 along with the reference signal $V_{er}$ taken from the ajustable contact of a reference set potentiometer 69. The output of amplifier 68 is a signal proportional to the difference between the input signals $V_{ed}$ and $V_{er}$. This difference or error signal is applied to an input of two conventional bistable switching circuits such as Schmitt Trigger circuits 70 and 71. The properties of Schmitt Trigger circuits are well known in the art and need not be explained here except to point out certain conventional design features which are employed therein. Trigger circuits 70 and 71 are designed so that the controller has a wide deadband before changing the direction of motor 66, allowing the control drums to make fine temperature adjustments. This is accomplished by biasing trigger circuit 70 so that when the output of amplifier 68 is positive it must exceed a predetermined positive threshold before the Schmitt Trigger 70 triggers, providing a positive signal output at least 72. When the output of amplifier 68 is negative, it must exceed a predetermined negative threshold before the Schmitt trigger 71 triggers to provide a negative signal output at lead 73 which is connected to an inverting amplifier 74 to provide a positive output signal at lead 75. Leads 72 and 75 are connected to inputs of AND gates 76 and 77, respectively. A constant frequency pulse generator 78 is provided having a common output connection to inputs of both gates 76 and 77. The output of gate 76 is connected to input CW of motor 66 so that when pulses from generator 78 are applied thereto through gate 76 being enabled by a positive output on lead 72 motor 66 steps in a clockwise direction, thus increasing the coolant flow through TTV valve 30. The output of gate 77 is connected to input CCW of motor 66 so that when pulses from generator 78 are applied thereto through gate 77 being enabled by a positive output on lead 75 motor 66 steps in a counterclockwise direction, thus decreasing the coolant flow through TTV 30.

Thus, rotation of the drums as sensed by potentiometer 62 is compared with the reference set position from potentiometer 69 and when the drum actuators average position exceeds a value which causes the output of amplifier 68 to exceed either the positive threshold of trigger circuit 70 or the negative threshold of trigger circuit 71, motor 66 is activated to resposition valves 30 and 34 to alter the coolant flow and thus the corresponding reactivity contribution as discussed above.

Figure 5:
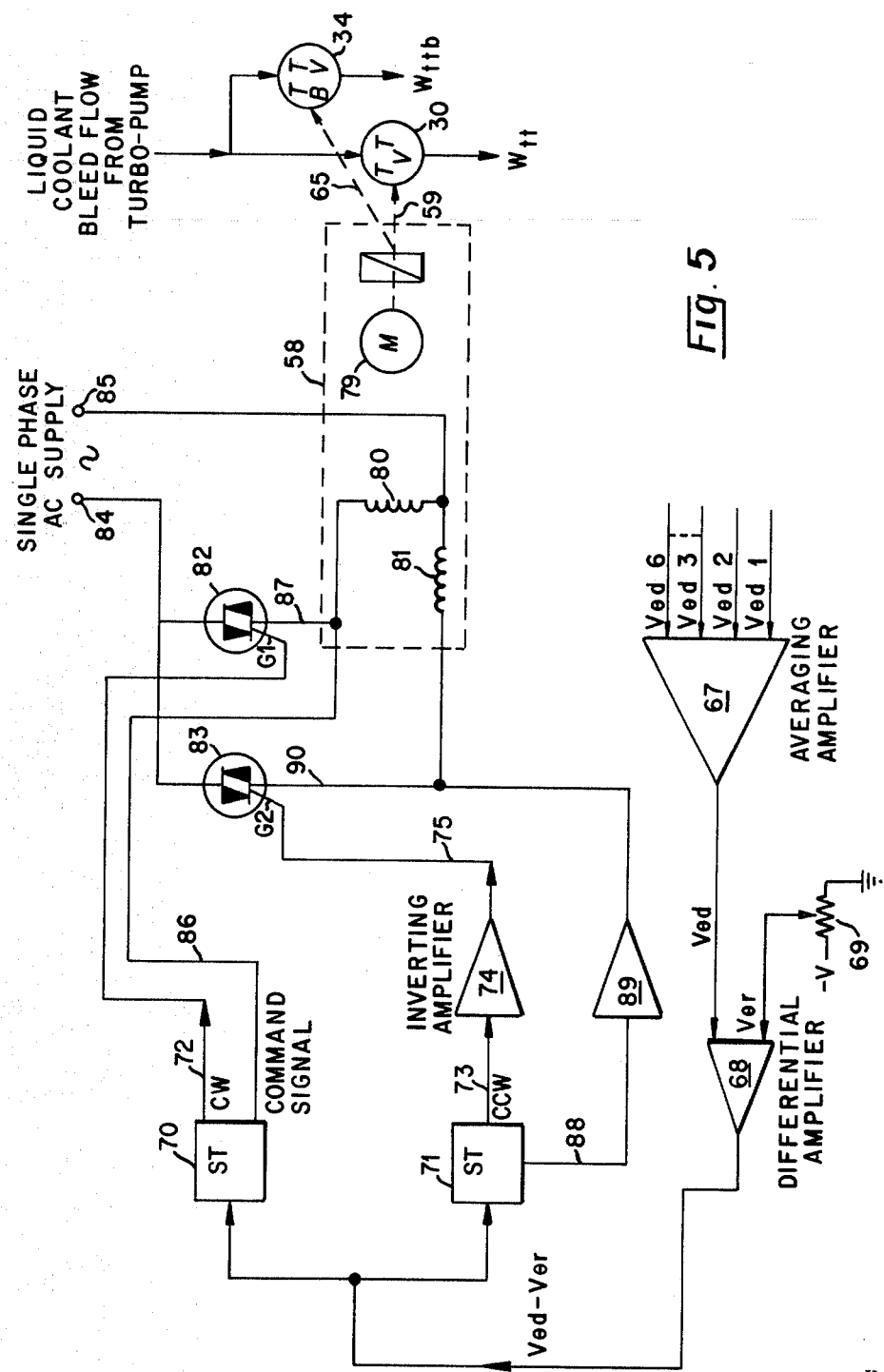
FIG. 5 is a schematic diagram showing a modification of the circuit of FIG. 4 for providing an A.C. motor and gear arrangement to drive the flow control valve.

Referring now to FIG. 5, there is shown a modification of the circuit of FIG. 4 in which a conventional A.C. two-phase motor and gear train 79 are used as an actuator 58 to position valves 30 and 34. Motor 79 is provided with windings 80 and 81 which are switched by silicon control rectifier components 82 and 83, respectively. Rectifiers 82 and 83 act as parallel inverse connected silicon control rectifiers and are commercially available components. A positive output pulse at lead 72 from trigger circuit 70 is connected to a gate lead G1 of control rectifier 82 causing it to be switched into a conductive state. This connects a single-phase A.C. supply, connected to terminals 84 and 85, across winding 80, causing motor 79 to rotate clockwise. Clockwise rotation continues until the trigger circuit 70 is switched back to its initial state producing a positive pulse on output lead 86 which is applied to terminal 87 of control rectifier 82, resetting it in a non-conductive state.

Counterclockwise rotation of motor 79 is controlled in a similar manner to that for clockwise rotation discussed above. A positive signal from amplifiers 74 on lead 75 connected to a gate lead G2 of control rectifier 83 causes the rectifier to be switched into a conductive state. This connects winding 81 across the A.C. input terminals 84 and 85, causing motor 79 to rotate counterclockwise. Counterclockwise rotation continues until trigger circuit 71 is switched back to its initial state providing a negative output at lead 88 connected to an inverting amplifier 89. Amplifier 89 provides a positive output which is connected to terminal 90 of control rectifier 83, resetting in a non-conductive state.

Figure 6:
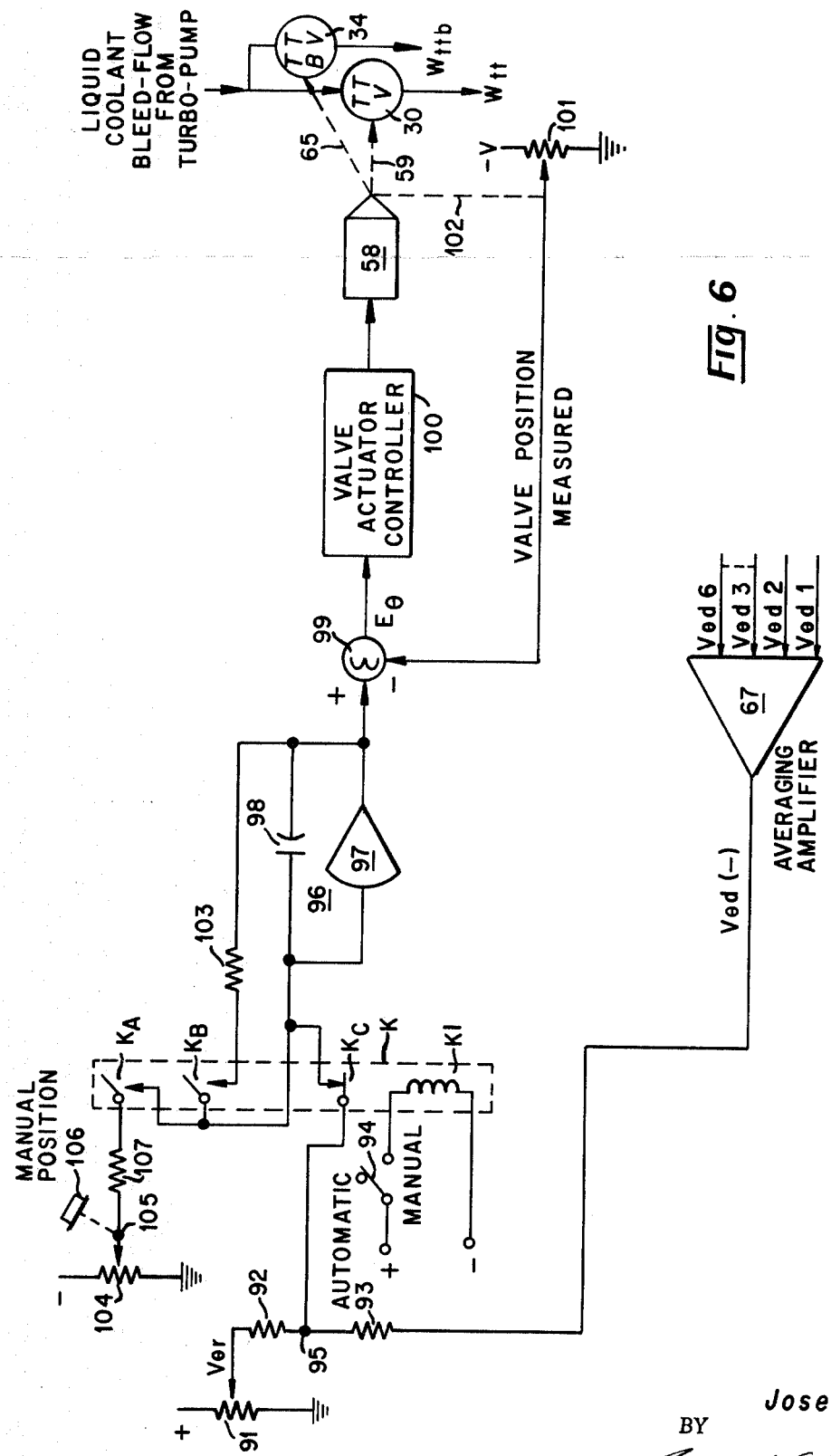
FIG. 6 is a schematic diagram of an alternate flow reactivity shim control servo embodiment using a closed loop position actuator to facilitate remote manual positioning of the tie tube flow control valve.

Referring now to FIG. 6, there is shown an alternate embodiment of a tie tube valve controller in which a closed loop position servo actuator for valves 30 and 34 is provided. This circuit provides the flexibility for controlling valves 30 and 34 manually or automatically. As shown, the negative average drum actuator position signal $V_{ed}$ from the averaging amplifier 67 and the positive drum reference set point signal $V_{er}$ obtained from potentiometer 91 are the input voltages to an integrator 96 consisting of an operational amplifier 97, feedback capacitor 98 and input resistors 92 and 93. A relay K is provided which has two normally open contacts ($K_A$ and $K_B$) and one normally closed contact ($K_C$). The relay actuating coil K1 is connected to an appropriate power supply through a switch 94. When switch 94 is in the automatic position, relay K is deenergized, as shown, and terminal 95 is connected through the normally closed contact $K_C$ to the summing junction of the operational amplifier 97. The drum position error signal ($E_{er} - V_{ed}$) is integrated by integrator 96 to provide a valve position demand signal at the output of amplifier 97 which is fed to an input of a summing network 99 of a closed loop position actuator. The output of the summing circuit 99 is connected to an input of an actuator controller circuit 100 which is connected to and controls actuator 58. The actuator controller circuit may be a stepping motor controller arrangement, as shown in FIG. 4, or an A.C. controller, as shown in FIG. 5.

In order to provide manual positioning of the valves 30 and 34, the movable contact of a potentiomter 101 is positioned by the rotation of the actuator 58 shaft by means of linkage 102. A negative reference voltage is applied across potentiometer 101 of a value necessary to provide a feedback signal proportional to the valve position which is connected to a separate input of summing circuit 99. Thus, when switch 94 is in the manual position, relay K is energized and contacts $K_A$ and $K_B$ are closed while contact $K_C$ is opened. By opening contact $K_C$ the drum position error signal ($V_{er}-V_{ed}$) is disconnected from the integrator. The integrating effect of the integrator is cancelled by contact $K_B$ connecting a resistor 103 between the summing junction and the output of amplifier 97. A potentiometer 104 having a negative voltage connected across it is provided for manual positioning of its adjustable lead 105 by a control knob 106. The potentiometer is calibrated to provide a reference output signal at lead 105 which is proportional to the desired position of valves 30 and 34. This signal is coupled to the input of the amplifier 97 through a resistor 107 and relay contact $K_A$. Thus, when relay K is energized, the signal from potentiometer 104, which is proportional to the desired valve position setting, is coupled to the input of summing circuit 99 where it is compared with the actual measured valve position to provide an error signal $E_\theta$ to position valves 30 and 34 responsive to the manual setting at 106.

It will be seen that a very versatile flow reactivity shim control system has been provided which is especially useful in controlling the radial temperatures and power distribution in a gas-cooled reactor, thus allowing the control drums to be operated at a predetermined steady state position, make fine temperature adjustments, and control start-up and shut-down of the reactor.

In view of the above and numerous other equal possible arrangements, the scope of the invention should be considered limited only by the following claims.

What is claimed is:

1. A flow reactivity shim control system for a nuclear rocket engine having an active core region disposed within a pressure chamber forming a thrust nozzle at an exit end thereof, a coolant storage tank, a pump for pumping the coolant through the active core region to be heated and exhausted through the nozzle to provide propulsive thrust, and control drums for gross reactor power level control, comprising: a plurality of coolant channels disposed in said core region, means for controllably supplying said coolant to said coolant chamber of said core region; pressure control means for controlling the pressure of said coolant passing through said pressure chamber; temperature control means for controlling the temperature of said coolant being heated by said core region; a plurality of counterflow coolant passages disposed in said active core region, said passages being spaced apart in an orderly array; a core tie tube disposed coaxially within each of said counterflow coolant passages; means for controllably supplying a portion of said coolant to an upper end of each of said tie tubes during reactor operation, each of said tubes being adapted at their lower ends for communicating said coolant flowing therein to said counterflow coolant passages so that by varying the flow of coolant through said support tubes, which counterflows through said counterflow passages, the residence mass of coolant in said core region is varied, thus varying the reactivity of the core region; and means responsive to the position of said control drums for controlling the flow of coolant through said tie tubes so that drums are operated at a predetermined steady state position during the engine operation.

2. A shim control system as set forth in claim 1 wherein said means for controllably supplying a portion of said coolant to said tie tubes includes a tie supply plenum connected in fluid communication with each of said tubes for distributing the flow of coolant thereto; fluid conducting means including a tie tube flow control valve connected between said pump and said tie tube supply plenum for conducting coolant fluid from said pump to said plenum, and an orifice connected in parallel with said tie tube supply valve for maintaining a predetermined minimum coolant flow to said tie tubes.

3. A flow reactivity shim control system as set forth in claim 2 wherein said means for controllably supplying said coolant to said coolant channels further includes a fluid conducting means including a tie tube bypass flow control valve connected between said pump and said pressure chamber for conducting said coolant into said pressure chamber for providing said coolant to be heated by said core region and exhausted through said nozzle.

4. A flow reactivity shim control system as set forth in claim 3 wherein said means for controlling the flow of coolant through said tie tubes responsive to the position of said control drums includes a drum position transducer means coupled to said control drums for providing an electrical output signal indicative of the position of said control drums, a reference position signal source, a controller circuit for receiving said output of said drum position transducer and said reference signal and providing an output when said drum position signal differs a predetermined amount from said reference signal, a valve actuator means electrically connected to the output of said controller circuit means for positioning said tie tube flow control valve responsive to said output of said controller circuit means.

5. A shim control system as set forth in claim 4 wherein said valve actuator means is a stepping motor having a gear train coupled thereto for mechanically driving said tie tube flow control valve.

6. A shim control system as set forth in claim 4 wherein said controller circuit means includes a differential amplifier adapted for receiving said reference signal and said drum position signal at separate inputs thereof, and providing an error signal output and switching means connected to the output of said differential amplifier for providing clockwise and counterclockwise stepping pulse at separate outputs responsive to the polarity of said error signal, said clockwise and counterclockwise stepping pulse outputs being connected to respective inputs of said stepping motor so that said motor steps clockwise upon receiving pulses from said clockwise stepping pulse output, and steps counterclockwise upon receiving pulses from said counterclockwise stepping pulse output.

7. A shim control system as set forth in claim 4 wherein said valve actuator is a two-phase A.C. motor having a gear train coupled thereto for driving said tie tube flow control valve, said two-phase A.C. motor having a first A.C. winding for controlling clockwise rotation and a second A.C. winding for controlling counterclockwise rotation.

8. A shim control system as set forth in claim 7 wherein said controller circuit means includes a switching means for selectively connecting a single-phase A.C. supply to said first and second windings of said two-phase A.C. motor responsive to the amplitude of said electrical signal output of said drum position transducer.

9. A shim control system as set forth in claim 4 wherein said controller circuit includes means for remote manual positioning of said tie tube flow control valve.

10. A shim control system as set forth in claim 4 wherein said valve actuator means further includes means coupled to said output of said tie tube valve actuator for positioning said tie tube bypass flow control valve opposite to said tie tube flow control valve, thereby maintaining a constant bleed flow from said pump.

11
11. A shim control system as set forth in claim 1 wherein said coolant pump is driven by a gas turbine having its intake connected to receive a portion of hot gas from said pressure chamber.

12. A shim control system as set forth in claim 11 wherein said pressure control means includes a pressure servo control means for sensing chamber pressure at the exit end thereof and automatically controlling the speed of said gas turbine responsive to said chamber pressure to control the nozzle pressure during engine operation in accordance with a pressure demand.

13. A shim control system as set forth in claim 7 wherein said temperature control means includes servo means for automatically positioning said control drums responsive to the coolant temperature of the core exit region so that the coolant temperature at the exit end of said pressure chamber is automatically controlled in accordance with a temperature demand during engine operation.

12
14. A shim control system as set forth in claim 1 wherein said coolant is hydrogen.

15. A shim control system as set forth in claim 1 wherein the volume of each of said tie tubes within said core region is greater than the volume of the corresponding counterflow coolant passage.

References Cited
UNITED STATES PATENTS 3,168,807   2/1965   Ledwith et al. ........ 60—203
3,286,468   11/1966  Plebuch ............. 176—39 X HARVEY E. BEHREND, Primary Examiner U.S. Cl. X.R.

176—33, 39, 59; 60—203

UNITED STATES PATENT OFFICE
CERTIFICATE OF CORRECTION

Patent No. 3,778,344            Dated December 11, 1973

Inventor(s) Joseph M. Walsh

It is certified that error appears in the above-identified patent and that said Letters Patent are hereby corrected as shown below:

Column 9, line 73, after "that" insert --said--.
    Column 10, line 3, after "tie" insert --tube--.

Signed and sealed this 9th day of July 1974.

(SEAL)
Attest:

McCOY M. GIBSON, JR.            C. MARSHALL DANN
Attesting Officer                Commissioner of Patents